Patented Feb. 4, 1930

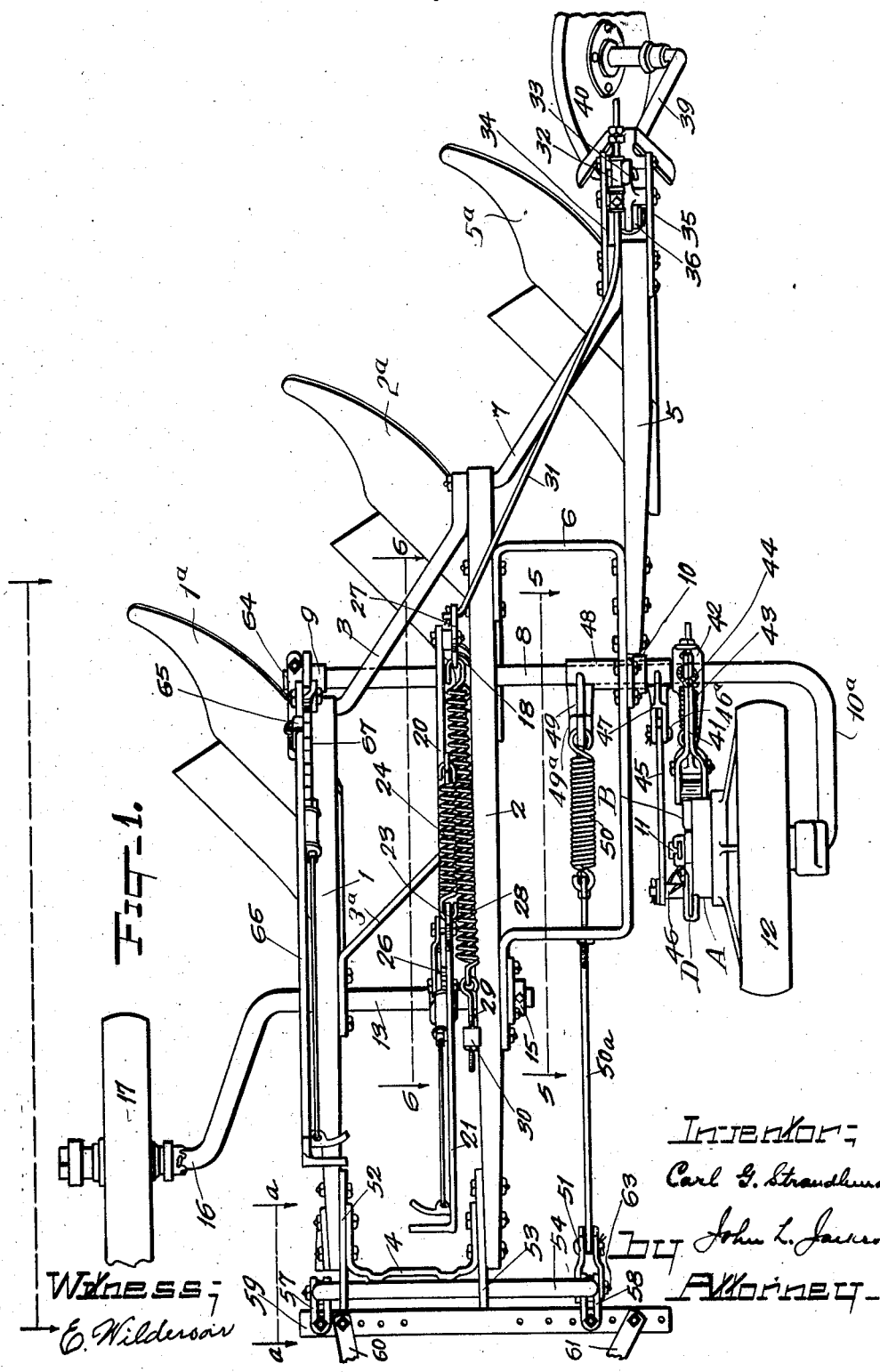

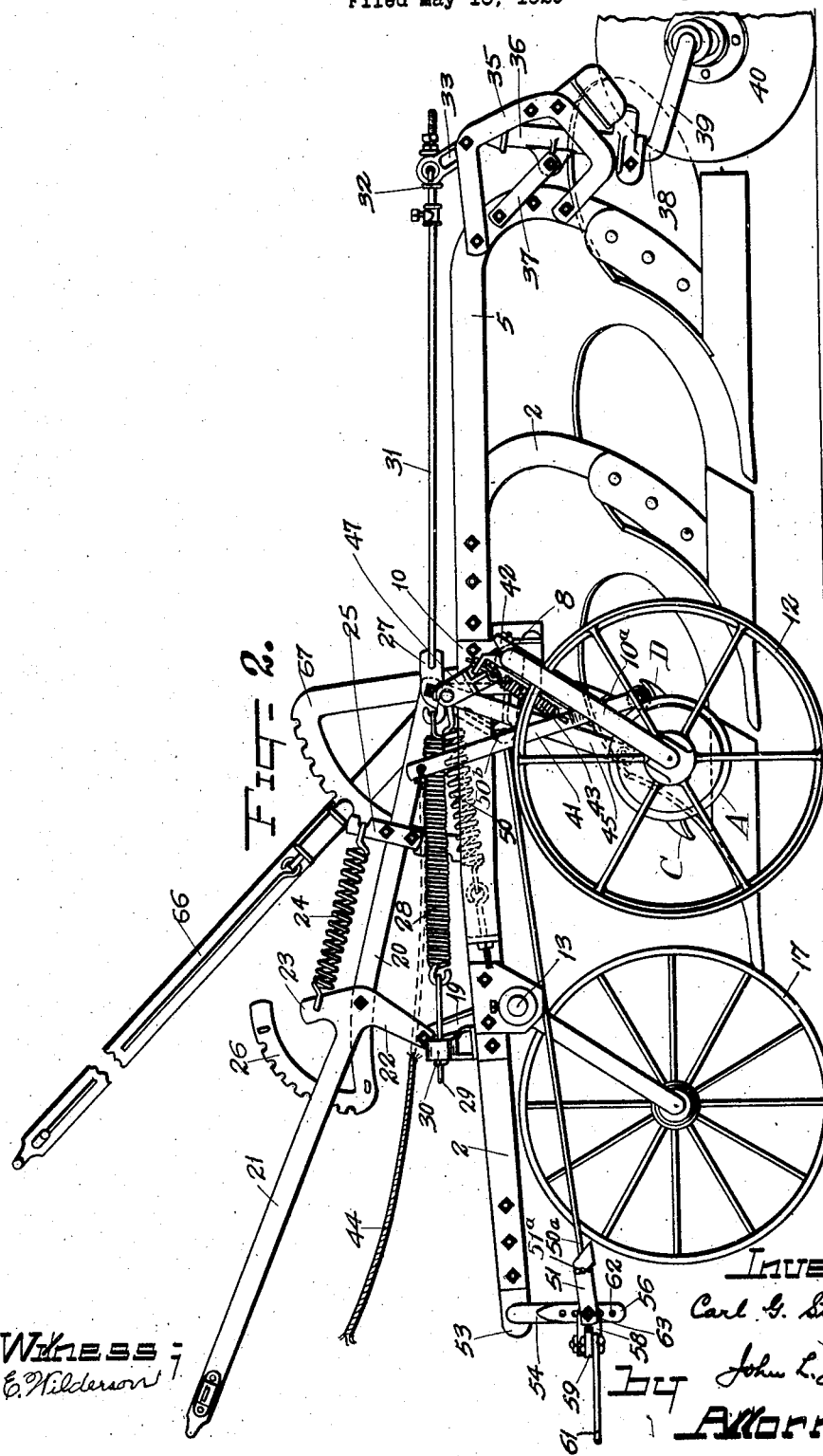

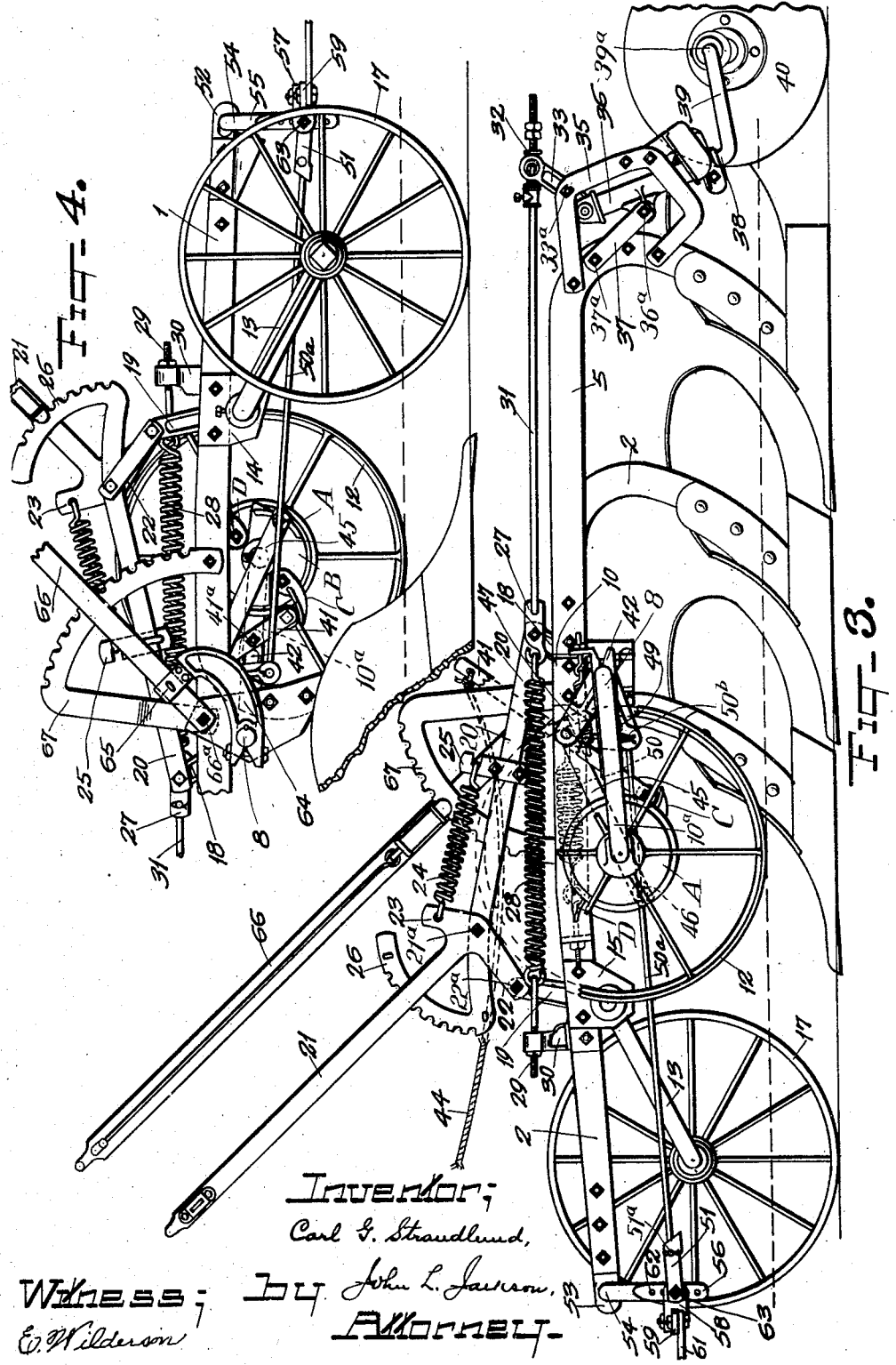

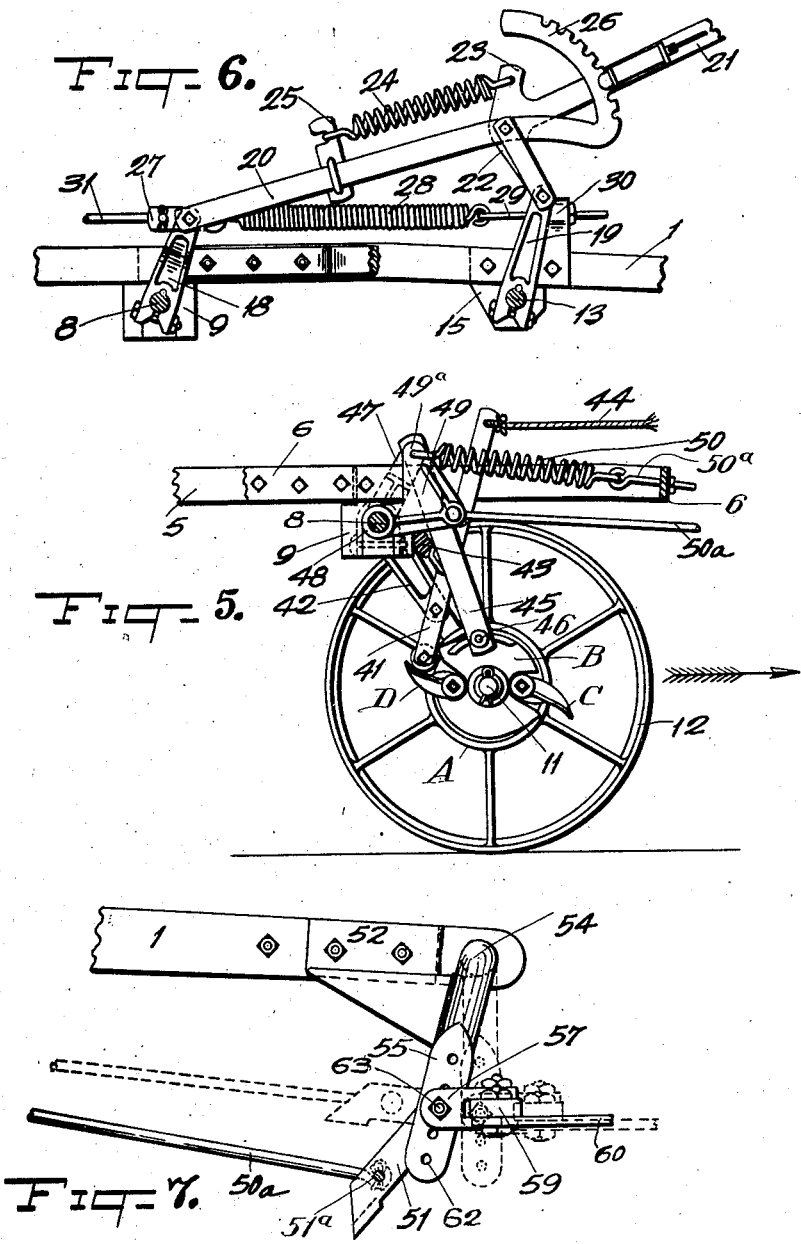

1,745,513

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

POWER-LIFT PLOW

Application filed May 18, 1925. Serial No. 31,085.

My invention relates to power lift gang plows of the type in which use is made of optionally controlled uni-directional clutch mechanism associated with one of the wheels, preferably the land wheel, for making the force of the draft effective to lift the plow frame with the plow bottoms carried thereby. Plows of this general design are commonly referred to as frameless gang plows, because no separate wheel-supported frame is provided, but the beams of the several plow units are connected together rigidly to form a frame which may comprise any desired number, in the present instance three, plow beams with their bottoms.

In plows of this type employing the uni-directional clutch mechanism, an example of which is found in Reissue Letters Patent No. 15,828, granted to me April 29, 1924, it has been customary to effect the lifting of the plow, by which I mean the frame together with the furrow openers carried thereby, through the instrumentality of a thrust member or link connected to an element of the clutch mechanism that is normally free from the other clutch element, the latter being constantly driven by the land wheel, the arrangement being such that by connecting the two clutch elements together so that the normally free element will be rotated with the land wheel, said thrust member by thrusting upward against the frame will swing the crank axle on which the land wheel is mounted rearwardly, thereby lifting the plow. Such thrust member is not connected directly to the frame, but is connected to a lever mounted on the frame and adjustable to shift the point of its connection with said thrust member vertically for the purpose of regulating the depth of plowing. Obviously with such a construction the height to which the plow is lifted above the ground by the action of the clutch mechanism varies in accordance with the depth at which the plow bottoms are set to operate. In other words, where the depth adjusting lever is set for deep plowing, the plow bottoms will be lifted by the operation of the clutch mechanism a less distance above the ground than where they are set for shallow plowing. Furthermore, in the prior plows referred to the lifting effort is applied entirely through the rotation of the land wheel and the actuation of the clutch mechanism effected thereby, and therefore as soon as the clutch members are disconnected, which occurs at the end of a half revolution thereof, no further lifting of the plow occurs.

While the plow which forms the subject matter of my present application makes use of clutch mechanism of the same type as that shown in my earlier patent above referred to, the power derived from the land wheel is utilized in quite a different way to effect the lifting of the plow, and, besides, I also apply the direct draft of the drawing element, such as a tractor or a team, to aid in the lifting operation. Also I provide for lifting the plow to the same height at all times regardless of the depth at which it is set to operate. The nature of my present improvements will be hereinafter fully explained in connection with the accompanying drawings, which illustrate the form in which I prefer to embody them.

In the drawings,—

Fig. 1 is a plan view;

Fig. 2 is a side elevation showing the positions of the parts when the plow is lifted or in transport position;

Fig. 3 is a similar view showing the plow down or in operative position;

Fig. 4 is a partial side elevation showing the furrowward side of the plow to illustrate particularly the stop mechanism for determining the depth of plowing;

Fig. 5 is a partial longitudinal vertical section on line 5—5 of Fig. 1 looking landward.

Fig. 6 is a like partial vertical section on line 6—6 of Fig. 1; and

Fig. 7 is a detail showing part of the draft mechanism as viewed from the direction indicated by the arrows at line a—a of Fig. 1.

As best shown in Fig. 1, what may be termed the frame of the plow comprises two parallel beams 1, 2 rigidly connected together at the rear by an inclined brace 3, and at the front by a U-shaped brace 4. They are also preferably connected intermediately by an inclined brace 3ª. The frame also comprises a third beam 5 parallel with the other two beams and connected rigidly to the beam 2 by an inclined rear brace 7 and an elongated brace in the form of a substantially rectangular frame 6 secured to the landward side of the beam 2. The several beams 1, 2 and 5 are provided respectively with plow bottoms 1ª, 2ª and 5ª, which may be of any suitable type. The plow frame, considered as an entirety, is mounted intermediately of the length thereof on a transverse axle 8 which is journaled in bearing members 9, 10 secured respectively to the rear end portion of the beam 1, and to the frame 6 adjacent to the forward end of the beam 5. Said axle is provided with a crank 10ª at its landward end having an inturned end portion 11 that extends furrowward parallel with the main portion of said axle and serves as a spindle for a land wheel 12. Obviously, by rocking the axle 8 the landward side of the frame may be raised or lowered.

The furrowward side of the frame is supported by a crank axle 13, which is journaled in bearings 14, 15 on the beams 1 and 2, respectively, and terminates in an outwardly extending spindle 16 on which is mounted a furrow wheel 17. Consequently by rocking the furrow wheel axle, the furrowward side of the frame may be raised or lowered, and by rocking the axles 8 and 13 in unison the front portion of the frame may be bodily raised or lowered to move the plow bottoms vertically.

In order that the axles 8 and 13 may be rocked in unison when desired, and also to provide for rocking the furrow wheel axle 13 alone for leveling the plow, I provide means which will now be described. As best shown in Fig. 6, the land wheel axle 8 is provided with an upwardly extending arm 18 that is fixedly secured thereto so that it rocks therewith, and in like manner the furrow wheel axle 13 is provided with an upwardly extending arm 19 which rocks with the latter axle. These two arms are adjustably connected together, so that while they are normally held in fixed relation to each other, they may be rocked relatively to each other. For this purpose a bar 20 is pivotally connected with the upper end portion of the arm 18 and extends forward therefrom over the arm 19 with which it is connected by means of a lever 21 fulcrumed upon the bar 20 intermediately thereof, as indicated at 21ª in Fig. 3, said lever having a downwardly extending arm 22 which is connected with the arm 19 by a bolt 22ª. The lever 21 also is provided with an arm 23 that extends upwardly from the pivot 21ª and serves as a connection for the forward end of a spring 24, the rear end of which is connected to an arm 25 rigidly secured to the bar 20 between the pivot 21ª and the rear end of said bar.

At its forward end the bar 20 carries a notched sector 26 adapted to be engaged by a latch of the usual type mounted on the lever 21 to hold said lever in its different positions of adjustment. By this construction manifestly when the lever 21 is locked to the sector 26, it forms a connection which holds the arms 18, 19 in fixed relation to each other, and therefore when said axles are rocked they rock in unison. Nevertheless, by unlocking the lever 21 from the sector 26, it may be actuated to rock the furrow wheel axle 13 independently of the land wheel axle 8, thereby raising or lowering the furrowward side of the frame with respect to the landward side thereof for leveling purposes.

Provision is also made for raising or lowering the rear portion of the frame, so that the frame as an entirety may be raised or lowered, but as the mechanism shown for that purpose is not new, and is fully described in my said patent, it need not be described here.

The clutch mechanism by which the traction of the land wheel is utilized in raising the plow is of the same type and construction as that shown in my Reissue Letters Patent No. 15,828, but, as has been suggested, it is not used in the same way to accomplish the lifting of the frame. As is well understood by those familiar with the art, such clutch mechanism comprises a clutch member A that is fixedly connected with the land wheel 12, so that it rotates continuously therewith, and a coacting clutch member B that is loosely mounted on the land wheel spindle 11 and is adapted to be operatively connected with said wheel by suitable clutching devices mounted between the two clutch members and controlled by two diametrically disposed rocking dogs C, D. These dogs, as shown in Figs. 3 and 4, project beyond the periphery of the clutch member B in position to be intercepted and actuated alternately by a trip lever 41 which is fulcrumed between its ends at 41ª on an arm 42 that is fixedly connected with the horizontal portion of the land wheel axle 8 and extends parallel and in line with the crank portion 10ª of said axle, but at the inner side of the land wheel 12, as best shown in Fig. 1. The lever 41 is adapted to rock fore and aft about its pivot 41ª in a vertical plane, and its lower end is normally held in contact with the periphery of the clutch member B so that it is adapted to intercept the dog C or D, as the case may be, by a spring 43 connected with said lever at a point above its pivot, and with the arm 42 adjacent to the axle 8. Preferably the lever 41 carries a roller at its lower end, as shown in Fig. 4. A cable 44 is connected with the upper end of said lever and extends forward to a point where it may be conveniently actuated by an operator on the tractor. By pulling forward on the upper end of said lever, its lower end will be rocked away from the clutch member B, thereby releasing the dog C or D with which it may have been in engagement, and permitting the clutching devices to operate to connect the clutch members A and B so that they rotate in unison. After the trip lever 41 has been actuated to release the dog, for example the dog C, as just described, the pull on the cable is relaxed, whereupon the spring 43 restores said lever to its normal position with the roller running on the periphery of the clutch member B; therefore when by the completion of a half revolution of the clutch the other dog, D, is brought into position to be engaged by the roller on said lever, it will be actuated thereby to disconnect the clutch members A and B. The land wheel may then continue to rotate, but the clutch member B will be held against rotation by the trip lever 41 through its engagement with the dog D, as described in my patent hereinbefore referred to.

The rotation of the clutch member B, effected as described, is utilized for the purpose of lifting the frame through the instrumentality of a thrust bar or link 45, the lower end of which is pivotally connected with a stud 46 carried by the clutch member B at a point adjacent to the margin thereof, as shown in Fig. 5. The upper end of said thrust bar is pivotally connected at $46^a$ with the upper end of an arm 47 carried by a sleeve 48 which is loosely mounted on the horizontal portion of the land wheel axle 8 and extends through the bearing 10, as best shown in Fig. 1. Preferably the arm 47 is integral with the sleeve 48. Said sleeve also is provided with an arm 49, preferably integral therewith, which extends forward from said sleeve and carries at a point in front of said sleeve an upwardly extending arm $49^a$, the arms 49, $49^a$ together forming what is substantially a bell-crank that lies in front of the sleeve 48 and has its horizontal arm 49 fixedly connected therewith. This arrangement is best shown in Fig. 5. The upper end of the arm $49^a$ of said bell-crank has connected to it the rear end of an extension spring 50, the forward end of which is adjustably connected by a hook bolt $50^a$ with the forward portion of the frame 6, as best shown in Figs. 1 and 5. It will be apparent, therefore, that by endwise or reciprocatory movement of the thrust bar 45 the sleeve 48 may be rocked on the land wheel axle 8, and that such rocking movement of said sleeve will vary the tension of the spring 50, upward movement of said thrust bar extending said spring, and downward movement thereof permitting it to relax. The spring therefore tends to move the thrust bar 45 endwise in a downward direction.

As shown in Fig. 3, when the plow is down in operative position, the crank portion $10^a$ of the land wheel axle extends forward and is approximately parallel with the plow frame, its angular relation to said frame depending on the depth of plowing, and when the parts are in position illustrated in said figure, the lower end of the thrust bar 45 lies below the axis of the land wheel with said axis approximately in dead center relation to the stud 46 and the pivot $46^a$. The spring 50 is at this time comparatively relaxed. When, however, the clutch members are connected to lift the plow, the stud 46 rotates in a counter-clockwise direction, as viewed in Fig. 3, about the axis of the land wheel, consequently moving the thrust bar 45 endwise in an upward and rearward direction, thereby, through the arm 47, rocking the sleeve 48 in a clockwise direction about the axle 8. As the arm $49^a$ to which the spring 50 is connected is fixed on said sleeve, said spring is accordingly extended to put it under greater tension. During the early part of this operation the position of the crank portion $10^a$ is not materially changed, and little, if any, lifting effect is produced so far as the plow frame is concerned, since the thrust bar 45 moves endwise relatively to said frame because the power of the spring 50 is not sufficient to lift the frame. Continued upward movement of the thrust bar 45, however, extends the spring to such a degree that it becomes strong enough to prevent further rocking of the sleeve 48, whereupon the arm 47 becomes a substantially stationary abutment against which the thrust of the thrust bar 45 is applied, and consequently the upward thrust applied to said thrust bar by the continued rotation of the land wheel swings the crank portion $10^a$ of the land wheel axle downward, thereby lifting the plow. By the time the land wheel has completed a half revolution, and the clutch members are automatically disconnected by the action of the trip lever 41 on the dog C or D, as the case may be, the spring 50 will have been extended practically to the limit of its intended range, and the lower end of the thrust bar 45 will have been carried somewhat forward of a point diametrically opposite that shown in Fig. 3, owing to the relative forward movement of the plow frame with respect to the axis of the land wheel incident to the lifting operation. The plow bottoms will then be clear of the ground, so that owing to the removal of earth resistance they may be lifted more easily than before they are broken out of the ground. Consequently, the force of the spring 50 applied to the upper end of the thrust bar 45 and acting in a downward direction, will rock the crank portion $10^a$ of the axle 8 further to the rear, bringing it to a more nearly vertical position, and consequently lifting the plow to a higher position above the ground, as illustarted in Fig. 2, where it will be held sustained by the force of said spring.

The arrangement of the shaft devices, and the means for controlling the depth of plowing will now be described. In this plow draft power is applied directly to the land wheel axle, rather than to the plow frame as in many prior constructions, for this purpose a draft rod 50ª being provided which is connected to the forward end of the arm 49, as best shown at 50ᵇ in Figs. 2 and 3, the forward end of said draft rod being connected to a vertically swinging link 51 by means of a pin 51ª. For connecting said link with the draft devices, I provide forwardly extending supports 52, 53 connected respectively to the forward ends of the beams 1, 2 preferably between the brace 4 and said beams, as shown in Fig. 1, and pivotally mounted in the forward end portions of said supports is a transverse rock-shaft 54 provided with downwardly extending arms 55, 56, preferably integral therewith, so that said rock-shaft with said arms constitutes an inverted bail. Connected with the arms 55, 56 respectively, and extending forward therefrom, are vertically swinging couplings 57, 58, to the forward end portions of which is secured a transversely disposed draw-bar 59. Links 60, 61 are connected with the end portions of the draw-bar for connecting it with a tractor or other draft power. The couplings 57, 58 may be adjusted vertically along the arms 55, 56 to vary the height of the draw-bar 59, this being accomplished by providing said arms with holes 62 through which bolts 63 may be passed to secure said couplings to said arms. It will be understood that the vertical position of the draw-bar 59 is adjusted in accordance with the depth at which it is intended to plow. For deep plowing the couplings 57, 58 will be connected in one of the upper holes 62 of the series, whereas for shallow plowing they will be connected with the lower holes of the series to avoid an undue amount of draft being carried by the furrow wheel and its bearings.

For limiting the depth of plowing, the axle 8 is provided with an arm 64 at its furrowed end, as best shown in Fig. 4, which arm is rigid with said axle and extends forward and upward therefrom, as shown, into position to engage a stop 65 carried by a lever 66 fulcrumed at 66ª on the frame of the plow. Said lever is provided with a notched sector 67 and with the usual spring actuated dog adapted to engage the teeth of said sector so that the lever may be locked in its different positions of adjustment. Obviously, since lowering of the plow bottoms is accomplished by swinging the axle 8 in a counter-clockwise direction as viewed in Fig. 4, as soon as the upper end of the arm 64 engages the stop 65 further rocking of the axle 8 in that direction will be prevented, so that the plow bottoms cannot descend any further.

By the arrangement of the draft devices as described, I provide a hitch to the tractor of the flexible type, that is to say, the links 60, 61 that connect at their forward ends with the tractor, together with their couplings 57, 58, can pivot at 63, so that the tractor may rise and fall independently of the plow, or the plow may rise or fall independently of the tractor, to follow uneven surfaces of the ground, but the front ends of the beams cannot tip up and down relatively to the draft connections, owing to the arm 55, 56 of the rock-shaft 54 that space the front ends of the beams and the draft devices apart. This construction, however, permits fore and aft movement of the plow beams with respect to the draft devices as the plow is raised and lowered with respect to the land wheel. In operation the couplings 57, 58 are attached to the arms 55, 56 at a height sufficient to ensure the draft pulling downwardly on the plow sufficiently to hold the furrow wheel against the ground, and thus together with the suck of the shares cause the plow to penetrate to its normal working depth. The depth adjusting devices have already been described, and it will be understood that the plow is levelled in the usual way by means of the lever 21, by the operation of which the furrow wheel axle may be rocked independently of the land wheel axle.

When the plow is in its operative position, which is shown in Fig. 3, it will be noted that the crank 10ª of the land wheel axle extends forward in approximate parallelism with the plow frame, at which time the arm 49 of the sleeve 48 extends forward and downward, the point 50ᵇ at which the draft rod 50ª is connected with said arm lying below the axis of the land wheel axle, so that said arm 49 stands at an angle to said draft rod. The force of the draft therefore tends to rock the sleeve 48ª on the axle 8 in a clockwise direction as viewed in Fig. 3, but so long as the trip lever 41 operatively engages the dog C and prevents the clutch member B from rotating, said sleeve cannot so rock, because it is held against doing so by the thrust bar 45. When, however, the trip lever 41 is actuated to release the dog C, the clutch member B is released so that it may rotate with the clutch member A, and is automatically connected therewith by the action of the clutching devices which follows the release of the dog C. As soon as the clutch member B is free to rotate, the thrust bar 45 is also made free to move endwise in an upward and rearward direction, thereby permitting the sleeve 48 to rock on the axle 8 under the influence of the draft applied to the arm 49. Said sleeve accordingly rocks in a clockwise direction not only under the influence of the draft, which swings the arm 49 upward into the line of draft, but also under the action of the thrust bar 45 which by its upward and rearward movement forces the arm 47 upwardly and rearwardly. At this time, of course, the plows being in the ground, their resistance causes them to lag behind while the draft action above described occurs, relative fore and aft movement between the draft rod 50ª and the plow frame incident to the swinging of the arm 49 across the line of draft being provided for by the rocking member 54 with its arms 55, 56. It will be evident from the foregoing that initially, after the trip lever 41 has been actuated, the spring 50 is extended to some extent by the force of the draft, and that this extension is continued by the action of the thrust bar 45, but this has no immediate lifting effect on the plow frame. As soon, however, as the power required to extend the spring 50 becomes greater than the power required to lift the weight of the plow, and overcome the resistance offered by the soil to its being lifted, further rocking of the sleeve 48 in a direction to extend the spring is prevented by the resistance of the spring, and consequently the force generated by the rotation of the ground wheel, applied through the thrust bar 45, reacts upon the crank axles to swing them relatively rearwardly under the plow frame, thereby lifting it. During the early stages of the lifting operation, more power is required to lift the plow than during the later stages. This is due to two reasons, first, the plows being in the ground present a heavier load and resistance to lifting than when they are free of the ground, and, second, the crank portions of the axles being in a position nearly horizontal, the weight of the plow has an advantage in leverage against the lifting force; but as the plows clear the ground, less resistance is offered, and as they approach a lifted position the crank axles assume a better lifting angle. Therefore the excess power generated by the draft action and the traction effort of the land wheel, which is stored in the spring 50 during the early stages of the lifting operation, is sufficient to elevate the plow a suitable distance above the ground for transport, as indicated in Fig. 2, and is utilized for that purpose. When the travel of the land wheel upon the ground has driven the clutch through its half cycle of operation, the clutch is automatically tripped by the trip lever 41 in the usual way, thereby disconnecting the clutch member B from the land wheel and holding it against further rotation while the land wheel is set free to rotate independently thereof. Thereupon the trip lever 41 acts as an abutment for the spring 50 to operate against in further swinging the crank 10ª to lift the plow frame, and this incidentally carries the lower end of the thrust bar 45 forward past center with reference to the axis of the land wheel. The plow then remains in transport position supported by the spring 50.

When it is desired to lower the plow, the operator actuates the trip lever 41 to release the dog D and connect the clutch members A, B, so that the latter rotates with the land wheel. The clutch being of the racing type, the power stored in the spring 50, which is also released upon the tripping of the dog D, acts to swing the arm 49 downward, thereby rocking the sleeve 48 and moving the arm 47 and thrust bar 45 downward and racing the clutch member B ahead of the wheel travel, carrying the clutch through the remaining half cycle of its operation. When the trip lever 41 is so actuated, the weight of the plow also will cause it to drop, the axle cranks rocking relatively forwardly and upwardly as the frame and plow bodies move downwardly. In the lowering operation the point of connection 50ᵇ of the draft rod 50ª of the arm 49 is carried below dead center with respect to the axis of the axle 8, and consequently the resistance offered by the plow bodies when they contact with and enter the ground causes the draft force to swing the arm 49 upwardly, and as the engagement of the trip lever with the dog C now holds the thrust bar 45 and crank 10ª in fixed relation, such upward movement of the arm 49 carries the crank 10ª with it, thereby relatively lifting the land wheel, or lowering the frame, until the arm 64 contacts with the stop 65, which stops the upward swing of the land wheel and consequently determines the depth of plowing. By reason of the fact that the furrow wheel axle 13 is connected with the land wheel axle, as described, it is simultaneously shifted to its plowing position with respect to the frame, and the rear furrow wheel is rocked in unison by the connection 31 in the usual way, so that the rear portion of the frame also is lowered.

It is believed that it will be clear from the foregoing description that my improved plow embodies the following characteristic features: The plow is lifted and lowered by a combination of direct draft force and power generated by a ground wheel, in this instance the land wheel; the lifting power is applied through a spring to the axles to rock the same to lifted position with respect to the frame; during the early stages of the lifting action power is stored in the spring and is later employed to lift the plow out of the ground; and irrespective of the plowing depth, the plow is always lifted to a predetermined height above the ground, by the action of the spring following the disconnection of the clutch members. In prior constructions using the half revolution clutch together with a thrust bar between the driven clutch member and the plow frame arranged to thrust against a fixed abutment on the frame, the action of the ground wheel lifts the plow through a range of predetermined extent from its set position for plowing, and consequently its height above the ground when lifted varies with the depth at which it is set to plow, but in my present construction that is not the case, as above indicated. So far as I am aware, these features are all generically new, and the claims thereto hereinafter made are therefore to be construed accordingly.

What I claim as my invention and desire to secure by Letters Patent, is—

1. A power lift plow comprising a frame, ground wheels supporting said frame for vertical movement, and lifting means including a thrust bar, a half revolution clutch optionally operable by one of the ground wheels to actuate said thrust bar, and means for transmitting the thrust of said thrust bar to the frame, including a spring connected with the frame, and a movable member operable by said thrust bar and connected with said spring.

2. A power lift plow comprising a frame, ground wheels supporting said frame for vertical movement, and lifting means including a thrust bar, a half revolution clutch optionally operable by one of the ground wheels to actuate said thrust bar, a spring connected with the frame, and a member movably supported by the frame and connected with said spring and with said thrust bar.

3. A power lift plow comprising a frame, ground wheels supporting said frame for vertical movement, and lifting means including a thrust bar, a half revolution clutch optionally operable by one of the ground wheels to actuate said thrust bar, a spring connected with the frame, and a pivotally mounted lever connected with said spring and with said thrust bar.

4. A power lift plow comprising a frame, ground wheels supporting said frame for vertical movement, and lifting means including a thrust bar, a half revolution clutch optionally operable by one of the ground wheels to actuate said thrust bar, a spring connected with the frame, and means supported by the frame and actuated by thrust bar, to transmit the lifting force of the thrust bar to the frame through said spring.

5. A power lift plow comprising a frame, ground wheels supporting said frame for vertical movement, and lifting means including a thrust bar, a half revolution clutch optionally operable by one of the ground wheels to actuate said thrust bar, a spring connected with the frame, and a lever pivotally supported by the frame and having arms respectively connected with said spring and with said thrust bar, and actuated by said thrust bar to vary the tension of said spring.

6. A power lift plow comprising a frame, ground wheels supporting said frame for vertical movement, a thrust bar, a half revolution clutch optionally operable by one of the ground wheels to actuate said thrust bar, means for transmitting the thrust of said thrust bar to the frame to lift the same, including spring means for further lifting the frame after the operation of said thrust bar by said clutch and additional means operable to regulate the depth of plowing.

7. A power lift plow comprising a frame, ground wheels supporting said frame for vertical movement, lifting means including a thrust bar, a half revolution clutch optionally operable by one of the ground wheels to actuate said thrust bar, and a spring connected with the frame and with said thrust bar, for transmitting the lifting force of the thrust bar to the frame, and additional means operable to regulate the depth of plowing.

8. A power lift plow comprising a frame, ground wheels supporting said frame for vertical movement, lifting means including a thrust bar, a half revolution clutch optionally operable by one of the ground wheels to actuate said thrust bar, a spring connected with the frame, and a pivotally mounted lever connected with said spring and with said thrust bar, and additional means operable to regulate the depth of plowing.

9. In a power lift plow comprising a frame, ground wheels supporting said frame for vertical movement, and lifting means including clutch mechanism optionally operable by one of the ground wheels to lift the frame, the combination with such lifting means of a draft connection, and means interposed between said draft connection and said lifting means, and actuated by the direct force of the draft to aid in lifting the frame.

10. A power lift plow comprising a plow-carrying frame, ground wheels supporting said frame for vertical movement, lifting means including a spring, a draft device, traction operated means for actuating said lifting means to lift the frame through said spring, and means connected with said draft device and actuated by the force of the draft, initially in the lifting operation, to store power in said spring.

11. A power lift plow comprising a frame, ground wheels supporting said frame for vertical movement, lifting means including a thrust bar, a half revolution clutch optionally operable by one of the ground wheels to actuate said thrust bar, and means for transmitting the thrust of said thrust bar to the frame to lift the same, including spring means for further lifting the frame after the operation of said thrust bar by said clutch, and a draft device connected with said spring means for applying the direct force of the draft to increase the lifting force of said spring means.

12. A power lift plow comprising a frame, ground wheels supporting said frame for vertical movement, lifting means including a thrust bar, a half revolution clutch optionally operable by one of the ground wheels to actuate said thrust bar, and a spring connected with the frame and with said thrust bar, for transmitting the lifting force of the thrust bar to the frame, and a draft device connected with said spring for applying the direct force of the draft to said spring to increase the tension thereof to aid in lifting the plow.

13. A power lift plow comprising a frame, ground wheels supporting said frame for vertical movement, and lifting means including a thrust bar, a half revolution clutch optionally operable by one of the ground wheels to actuate said thrust bar, a spring connected with the frame, and a pivotally mounted lever connected with said spring and with said thrust bar, and actuated by said thrust bar to vary the tension of said spring, and a draft connection connected with said lever for actuating the same by the force of the draft to increase the tension of said spring to aid in lifting the plow.

14. In a power lift plow comprising a frame, crank axle supported ground wheels therefor, and lifting means for swinging the cranks relatively to the frame, including a thrust bar and a half revolution clutch optionally operable by one of the ground wheels to actuate said thrust bar, the combination with such lifting means of a spring connected with the frame, and a pivotally mounted lever connected with said spring and with said thrust bar, said lever operating to transmit the lifting force of the thrust bar to the frame through said spring.

15. In a power lift plow comprising a frame, crank axle supported ground wheels therefor, and lifting means for swinging the cranks relatively to the frame, including a thrust bar and a half revolution clutch optionally operable by one of the ground wheels to actuate said thrust bar, the combination with such lifting means of a spring connected with the frame, and a pivotally mounted lever connected with said spring and with said thrust bar, said lever operating to transmit the lifting force of the thrust bar to the frame through said spring, and a draft connection connected with said lever for actuating the same by direct draft force.

16. A power lift plow comprising a plow-carrying frame, ground wheels supporting said frame, fore and aft swinging cranks on which said wheels are journaled, an optionally controlled half revolution clutch associated with one of said ground wheels and adapted to be actuated thereby, a thrust bar actuated by said clutch, a spring connected with the frame, means interposed between said thrust bar and the spring whereby said thrust bar acts to lift the frame through said spring, and a draft connection connected with the latter means.

17. A power lift plow comprising a plow-carrying frame, ground wheels supporting said frame, fore and aft swinging cranks on which said wheels are journaled, an optionally controlled half revolution clutch associated with one of said ground wheels and adapted to be actuated thereby, an upwardly movable thrust bar actuated by said clutch, an extension spring connected with said frame, and a rocking member connected with said spring, and actuated by upward movement of said thrust bar to extend the spring and lift the frame therethrough.

18. A power lift plow comprising a plow-carrying frame, ground wheels supporting said frame, fore and aft swinging cranks on which said wheels are journaled, an optionally controlled half revolution clutch associated with one of said ground wheels and adapted to be actuated thereby, an upwardly movable thrust bar actuated by said clutch, an extension spring connected with said frame, and a bell-crank lever connected with said thrust bar and normally held in a fixed position by said spring, and actuated by upward movement of said thrust bar to extend the spring and lift the frame therethrough.

19. A power lift plow comprising a plow-carrying frame, ground wheels supporting said frame, fore and aft swinging crank axles on which said wheels are journaled, adjustable means associated with one of said axles for controlling the position of the land wheel axle when the plow is lowered, an optionally controlled half revolution clutch associated with one of said wheels and adapted to be actuated thereby, an upwardly movable thrust bar actuated by said clutch, a movable member mounted on the frame and actuated by said thrust bar, a spring connected with said member and with said frame whereby said thrust bar acts through said spring to lift the frame, a draft device, and means actuated by said draft device and cooperating with said thrust bar initially in the lifting operation to actuate said member to increase the tension of said spring.

20. A power lift plow comprising a plow-carrying frame, ground wheels supporting said frame, fore and aft swinging crank axles on which said wheels are journaled, adjustable means associated with one of said axles for controlling the position of the land wheel axle when the plow is lowered, an optionally controlled half revolution clutch associated with one of said wheels and adapted to be actuated thereby, an upwardly movable thrust bar actuated by said clutch, a bell-crank lever pivotally mounted on one of said axles and connected with said thrust bar to be actuated thereby, a spring connected with said lever and with the frame and normally holding said lever in a fixed position, said spring being arranged to be extended by upward movement of said thrust bar to apply lifting force to the frame, a draft device, and means actuated by said draft device and cooperating with said thrust bar initially in the lifting operation to actuate said lever to increase the tension of said spring.

21. A power lift plow comprising a plow-carrying frame, crank axles journaled on said frame to swing fore and aft, land and furrow wheels mounted on the crank portions of said axles respectively, an optionally operable half revolution clutch associated with said land wheel, an endwise movable thrust bar actuated by said clutch, a sleeve journaled on said land wheel axle and having an arm connected with said thrust bar, an extension spring connected at one end with said frame, and an arm carried by said sleeve and connected with said spring, the arrangement being such that upward movement of said thrust bar operates to rock said sleeve and extend said spring.

22. A power lift plow comprising a plow-carrying frame, crank axles journaled on said frame to swing fore and aft, land and furrow wheels mounted on the crank portions of said axles respectively, an optionally operable half revolution clutch associated with said land wheel, an endwise movable thrust bar actuated by said clutch, a sleeve journaled on said land wheel axle and having an arm connected with said thrust bar, an extension spring connected at one end with said frame, an arm carried by said sleeve and connected with said spring, the arrangement being such that upward movement of said thrust bar operates to rock said sleeve and extend said spring, and means adjustable to control the depth of plowing.

23. A power lift plow comprising a plow-carrying frame, crank axles journaled on said frame to swing fore and aft, land and furrow wheels mounted on the crank portions of said axles respectively, an optionally operable half revolution clutch associated with said land wheel, an endwise movable thrust bar actuated by said clutch, a sleeve journaled on said land wheel axle and having an arm connected with said thrust bar, an extension spring connected at one end with said frame, an arm carried by said sleeve and connected with said spring, the arrangement being such that upward movement of said thrust bar operates to rock said sleeve and extend said spring, and means adjustably mounted on the frame and cooperating with the land wheel axle to limit the depth of plowing.

24. A power lift plow comprising a plow-carrying frame, crank axles journaled on said frame to swing fore and aft, land and furrow wheels mounted on the crank portions of said axles respectively, an optionally operable half revolution clutch associated with said land wheel, an endwise movable thrust bar actuated by said clutch, a sleeve journaled on said land wheel axle and having an arm connected with said thrust bar, an extension spring connected at one end with said frame, an arm carried by said sleeve and connected with said spring, the arrangement being such that upward movement of said thrust bar operates to rock said sleeve and extend said spring, and a draft device connected with said sleeve and tending to extend said spring when the frame is in plowing position.

25. A power lift plow comprising a plow-carrying frame, crank axles journaled on said frame to swing fore and aft, land and furrow wheels mounted on the crank portions of said axles respectively, an optionally operable half revolution clutch associated with said land wheel, an endwise movable thrust bar actuated by said clutch, a sleeve journaled on said land wheel axle and having an arm connected with said thrust bar, an extension spring connected at one end with said frame, an arm carried by said sleeve and connected with said spring, the arrangement being such that upward movement of said thrust bar operates to rock said sleeve and extend said spring, an arm extending forwardly and downwardly from said sleeve when the frame is in plowing position, and a draft rod connected with said arm.

26. In a power lift plow comprising a frame, crank axle supported ground wheels therefor, and lifting means for swinging the cranks relatively to the frame, including a thrust bar and a half revolution clutch optionally operable by one of the ground wheels to actuate said thrust bar, the combination with such lifting means, of a pivotally mounted lever connected with said thrust bar, and means for limiting the movement of said lever, said lever operating to transmit the lifting force of the thrust bar to the frame through said last named means.

CARL G. STRANDLUND.